United States Patent
Holden et al.

(10) Patent No.: US 6,657,095 B1
(45) Date of Patent: Dec. 2, 2003

(54) CONTINUOUS TEMPERATURE VARIANCE PYROLYSIS FOR EXTRACTING PRODUCTS FROM TIRE CHIPS

(75) Inventors: Harold H. Holden, Ardmore, OK (US); H. Scott Holden, Ardmore, OK (US)

(73) Assignee: Recycled Energy, L.L.C., Ardmore, OK (US)

( * ) Notice: Subject to any disclaimer, the term of this patent is extended or adjusted under 35 U.S.C. 154(b) by 0 days.

(21) Appl. No.: 09/647,391

(22) PCT Filed: Mar. 31, 1999

(86) PCT No.: PCT/US99/07163

§ 371 (c)(1),
(2), (4) Date: Sep. 29, 2000

(87) PCT Pub. No.: WO99/50374

PCT Pub. Date: Oct. 7, 1999

Related U.S. Application Data

(60) Provisional application No. 60/080,329, filed on Apr. 1, 1998.

(51) Int. Cl.[7] ............................. C10G 1/10; C10B 47/30
(52) U.S. Cl. ........................ 585/241; 585/240; 201/25; 202/99; 202/100
(58) Field of Search ................................ 585/240, 241; 201/25; 202/99, 100

(56) References Cited

U.S. PATENT DOCUMENTS

| | | | |
|---|---|---|---|
| 4,384,151 A | 5/1983 | Audibert et al. | |
| 4,647,443 A | 3/1987 | Apffel | |
| 4,983,278 A | 1/1991 | Cha et al. | |
| 5,095,040 A | 3/1992 | Ledford | |
| 5,389,691 A | 2/1995 | Cha et al. | |
| 5,470,384 A | * 11/1995 | Cha et al. | 106/273.1 |
| 5,735,948 A | * 4/1998 | Cha et al. | 106/719 |

\* cited by examiner

*Primary Examiner*—Walter D. Griffin
(74) *Attorney, Agent, or Firm*—Fellers, Snider, et al.; Bill D. McCarthy

(57) ABSTRACT

An apparatus and process for pyrolyzing waste tire chips, the tire chips passed into an inclined rotary kiln having an output end. The tire chips are saturated by oil in the inclined rotary kiln and are pyrolyzed by indirectly heating with a heated gas. The pyrolyzed tire chips and oil produces a vapor product and a solid product that are separated within the kiln by gravitational separation. The vapor product is processed to condense oil and a portion of the condensed oil is recycled to the rotary kiln. The solid product is separated into oil and char, a portion of the oil recycled to the inclined rotary kiln for saturating the tire chips. The vapor product following the oil removal is used to produce the heated gas to heat the rotary kiln.

11 Claims, 8 Drawing Sheets

FIG. 2

Mass and Energy Balances

| | | |
|---|---|---|
| Shell Dia | 6.00 | Ft. |
| Kiln I.D. | 5.92 | Ft. |
| Length | 60 | Ft. |

| | | |
|---|---|---|
| Feed Rate | 10,000 | Lbs/Hr |
| Flowrate Non-condensables | 1,000 | Lbs/Hr |
| Water | 0 | Lbs/Hr |
| Solids | 3,500 | Lbs/Hr |
| Oil | 5,500 | Lbs/Hr |
| Recirculated Oil | 1,000 | Lbs/Hr |

| | | |
|---|---|---|
| Solids | 35.0% | wt |
| Gas | 10.0% | wt |
| Oil | 55.0% | wt |
| Water | 0.0% | wt |

| | | |
|---|---|---|
| Process Air Temperature | 70 | F |
| Product Inlet Temp | 60 | F |
| Rubber BP | 400 | F |
| Estimated Max Product Temp | 824 | F |
| Calc Max Product Temp | 823 | F |

| | | |
|---|---|---|
| Calculated Natural Gas | (1) | Scfh |
| Calc Operating Temp Firend K | 1,350 | F |
| Exhaust Gas Temp. | 1,350 | F |
| Flue Gas Exit Temp | 690 | F |

| | | |
|---|---|---|
| Ambient Temperature | 70 | F |
| Altitude | 700 | F |
| Barometric Pressure | 14.46 | psia |
| Air Density | 0.074 | Lbs/cu. ft. |

| | | |
|---|---|---|
| Tire Gas to Gen Set | 100 | % |
| Engine Excess Air | 1.00 | % |
| Heat Value to Gen Set | 17,022,589 | Btu/hr |
| Shaft power of Engine | 2,165 | HP |
| Generator Output | 1,534 | KW |

| | | |
|---|---|---|
| Kiln Velocity | 1.05 | Fps |
| Est. Oil required Condenser | 0.31 | Gpm |
| Stack Flow | 3.996 | Scfm |
| | 8.049 | Acfm |
| Stack Temp | 570 | F |
| O2 Engine Exhaust | 0.20° | |
| Natural Gas Price | $3.00 | 1000 scf |

FIG. 3

Mass and Energy Balances

| PRODUCT DISCHARGE HOOD | | |
|---|---:|---|
| Gas Flow In | 7500 | Lbs/Hr |
| Gas Flow Out | 7576 | Lbs/Hr |
| Spec Ht Out | 0.39 | Btu/Lb deg F |
| Inlet Temp | 824 | F |
| Shell Heat Loss rate | 103 | Btu/Hr-sq. ft. |
| Shell Heat Loss | (7,740) | Btu/Hr |
| Gas to Quench | (2,209,732) | Btu/Hr |
| Total Heat Out | (2,217,472) | Btu/Hr |
| Total Heat In | (2,217,472) | Btu/Hr |
| Outlet Temp | 827 | F |

FIG. 4

Mass and Energy Balances

| CONDENSER/SCRUBBER | |
|---|---|
| Inlet Flue Flow | 7,576 Lbs/Hr<br>515 Scfm<br>1,275 Acfm |
| Estimated Oil Required<br><br>Calc Oil Required<br>Inlet Flue - Oil Flow | 0.31 Gpm<br>18 Gph<br>49 Scfm<br>140 Lbs/Hr<br>7,715 Lbs/Hr |
| Oil Inlet Temp<br>Air Temp<br>Desired quench exit temp<br>Oil Temp Rise<br>Inlet temp | 100 F<br>70 F<br>140 F<br>40 F<br>827 F |
| Heat adsorbed by Oil<br>Oil condensing<br>Incoming Heat to be Adsorbed | (2,773,807) Btu/Hr<br>771,420 Btu/Hr<br>2,005,289 Btu/Hr |
| Oil recovered | 5,500 Lbs/Hr<br>12.06 Gpm<br>413.53 BBL/D |
| Outlet Flue Flow | 68 Scfm<br>78 Acfm<br>1000 Lbs/Hr |

FIG. 5

Mass and Energy Balances

| ENGINE | |
|---|---|
| Total Gas Flow<br>Input Outlet Temperature | 14047 Lbs/Hr<br>1,350 F |
| Heat used in engine<br>Gas to Thermal Extractor | (11,552,768) Btu/Hr<br>5,469,821 Btu/Hr |
| Total Heat Out | (17,022,589) Btu/Hr |
| Total Heat In | 17,022,589 Btu/Hr |
| Heat from Combustion | 17,022,589 Btu/Hr |

FIG. 6

Mass and Energy Balances

| PLENUM | |
|---|---|
| Total Gas Flow | 14,202 Lbs/Hr |
| | 187,568 Scfh |
| Exhaust Exit Temp. | 1350 F |
| Flue Gas Exit Temp. | 690 F |
| Shell Heat Loss rate | 328 Btu/Hr-sq.ft. |
| Box Heat Loss | (743,979) Btu/Hr |
| Heat Rubber | (1,760,060) Btu/Hr |
| Heat Carbon & Ash | (237,440) Btu/Hr |
| Vaporize SBR | 981,500 Btu/Hr |
| Vaporize Recirc Oil | (118,680) Btu/Hr |
| Heat H/C Vapor | (1,131,728) Btu/Hr |
| Gas to Stack | (2,458,330) Btu/Hr |
| Total Heat Out | (5,468,718) Btu/Hr |
| Total Heat In | 5,469,822 Btu/Hr |
| Heat from Engine | 5,469,821 Btu/Hr |
| Delta T | 0.11 F |
| Delta HR | 1.104 Btu/Hr |
| Annulus Flow | 187,568.21 Scfn |
| | 542,708.53 Acfn |
| | 150.75 Acfs |
| Annulus Vel | 46.69 fps |

FIG. 7

Mass and Energy Balances

| STACK GAS | |
|---|---|
| Gas from Fire Box<br>Gas from Air Leak<br>Firebox Outlet Temp | 14202 Lbs/Hr<br>3988 Lbs/Hr<br>690 F |
| Stack Heat Loss rate | 55 Btu/Hr-sq.ft. |
| Gas to Atomosphere | (2,458,330) Btu/Hr |
| Total Heat Out | (2,458,330) Btu/Hr |
| Total Heat In | (2,458,330) Btu/Hr |
| Stack Flow | 482,931 Acfh<br>134.15 Acfs |
| Stack Area | 452.39 Sq. in.<br>3.14 Sq. ft. |

CONTINUOUS TEMPERATURE VARIANCE PYROLYSIS FOR EXTRACTING PRODUCTS FROM TIRE CHIPS

This application is a 371 of PCT/US99/07163, filed Mar. 31, 1999, which claims benefit of 60/080,329, filed Apr. 1, 1998

FIELD OF THE INVENTION

The present invention relates to a continuous temperature variance pyrolysis process and apparatus for recovering valuable oil products, carbon black, steel, and uncondensed vapors from tire chips.

BACKGROUND OF THE INVENTION

Over the past few decades the growth of illegal tire dumps has become a major environmental and health problem. Waste tires are generated in the United States at an estimated rate of approximately 240 million tires per year. Of the 240 million waste tires, approximately 200 million are estimated to be land filled or stockpiled. However, the very characteristics that ensure durability of the tires also make their disposal difficult whereby discarded tires can last between 500 to 1000 years in the environment. Therefore, these tires pose a unique landfill problem. In addition to becoming breeding grounds for countless varieties of vermin and mosquitoes, discarded tires are known to "float" to the surface, exerting sufficient force to rupture the landfill cap. Moreover, piles of discarded tires, such as those existing at numerous sites around the world, can serve as fuel for sustaining combustion once the piles are somehow set ablaze, such as by lightning or by accidental or purposeful human agency.

In order to prevent such major environmental hazards, increasingly the waste tires have been shredded into more manageable tire chips. While some companies continue to burn the whole tire for fuel, many others use the tire chips to fuel other processes. However, with the utilization of these methods, valuable byproducts such as carbon black are needlessly wasted. Moreover, gas emissions from the burning process can prove harmful to the environment.

One economically feasible and environmentally effective means for disposing of the tire chips is through the process of pyrolysis. The tire chips can be pyrolized to yield saleable products including gases, useful oil and carbon black.

Pyrolysis is the process of utilizing heat to cause a chemical change in a substance. In particular, the actual pyrolysis process is the result of the heat-induced chemical decomposition of organic materials in the absence of oxygen. Saturating the chips with process oil effectively facilitates the pyrolysis to yield pyrolytic gas, oil, and a char-steel mixture. The char is a fine particulate matter composed of carbon black, char and other inorganic materials, such as zinc oxide, carbonates and silicate.

Pyrolysis is especially appealing for tire chip disposal because each product and by-product of the pyrolytic process is marketable. The generated gas has a heat value of from about 170 to 2,375 BTU/ft$^3$. The produced light oils can be sold for gasoline additives to enhance octane, and the heavy oils can be used as a replacement for number six fuel oil. The solid char can be upgraded and sold as carbon black.

Pyrolysis poses little to no harm to the environment because of the absence of harmful emissions. However, upgrading char to carbon black and the pyrolytic process itself can prove expensive. Moreover, tire pyrolysis can prove economically detrimental if an efficient process is not utilized to produce a sufficient amount of product yield. Examples of such systems are disclosed in U.S. Pat. No. 4,983,278 issued Jan. 8, 1991 to Cha et al.; U.S. Pat. No. 5,389,691 issued Feb. 14, 1995 to Cha et al.; and U.S. Pat. No. 4,647,443 issued Mar. 3, 1987 to Apffel.

Accordingly, there continues to be a need in the industry for improvements in the effective pyrolytic disposal of tire chips.

SUMMARY OF THE INVENTION

The present invention discloses an apparatus and process for pyrolyzing waste tire chips to extract carbon black oil, and various gases. The tire chips are fed into an inclined rotary kiln and exposed to heat at continuously varying temperature as the tire chips move through the kiln. Within the kiln, the tire chips are soaked in oil such that a chemical reaction occurs, resulting in a dry solid product and a gaseous, vapor product. The solid product is subsequently fed through a magnetic separator which separates the steel from the remaining char. The char can then be upgraded to yield carbon black.

The gaseous product stream passes through multiple condenser/scrubbers to yield a purified form of oil for storage, char for conversion into carbon black, and uncondensed gas used as fuel for the kiln.

These and various other features and advantages, which characterize the present invention, will be apparent from a reading of the following detailed description and a review of the associated drawings.

BRIEF DESCRIPTION OF THE DRAWINGS

FIG. 3 provides mass and energy balances for the product discharge hood depicted in FIGS. 1A and 1B.

FIG. 4 provides mass and energy balances for the Condenser/Scrubber depicted in FIGS. 1A and 1B.

FIG. 5 provides mass and energy balances for the Engine depicted in FIGS. 1A and 1B.

FIG. 6 provides mass and energy balances for the Plenum depicted in FIGS. 1A and 1B.

FIG. 7 provides mass and energy balances for the Stack Gas depicted in FIGS. 1A and 1B.

DETAILED DESCRIPTION

Figure 1:
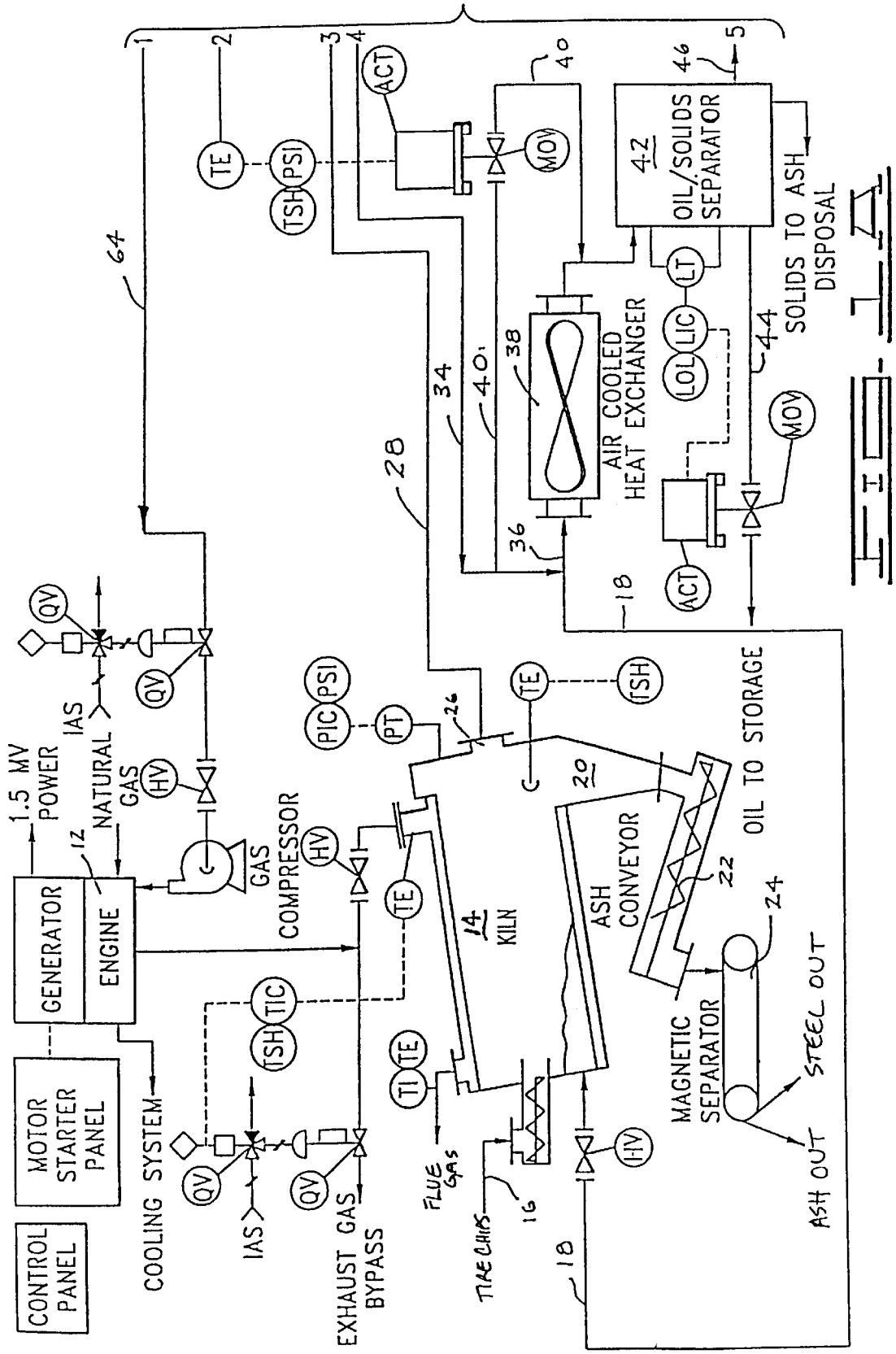
FIGS. 1A and 1B together depict a flow diagram for a pyrolysis process for extracting products from tire chips in accordance with the present invention, with FIG. 1A depicting a portion of the process for the char and heavy oil recovery, and FIG. 1B depicting a portion of the process for vapor condensation.

It will be noted that FIG. 1A and FIG. 1B depict portions of the same process, and placed together, depict a preferred embodiment of the present invention for extracting products from waste tire chips. For purposes of facilitating discussion, the process has been divided into two figures. Therefore, conduit streams that have been truncated in FIG. 1A have been numbered from 1 to 5 to correspond to identical numbers in FIG. 1B to show the continuation of the conduit streams.

Referring now to FIG. 1A, shown therein is a process flow diagram illustrating an apparatus 10 for the pyrolysis of tire chips, constructed in accordance with the present invention.

While the present invention is described in detail hereinbelow, it will be noted that details of construction involving the usual piping, valving, electrical systems, and controls associated with the process equipment of the type herein described will be known to people of ordinary skill in this area of technology and need not be included herein.

As the production of waste tires increases, there is an ever increasing need to find improvements in methods of disposal. To this end, the present invention provides a pyrolysis process for decomposing tire chips into oil, carbon black and gas.

In FIG. 1A, an engine 12 provides a heated gas to a kiln 14 for heating the kiln 14 to the desired temperature to initiate the pyrolysis process. The kiln 14 is a large double drum assembly that tilts slightly upward at its output end with an inner cylinder or drum rotating slowly so that the solid contents of the inner cylinder are augered to the upper end. An outer cylinder forms a shell about the rotating inner drum, and an annular space is formed between the inner drum and outer shell. Such rotating drum kilns are conventionally known and need not be described further herein except to note that the movement of the contents within the rotating inner drum is achieved by auger members disposed along the internal surface of the rotating inner drum.

The exhaust gas of the engine 12 is conveyed to pass through the annular space between the outer shell (not shown) and the inner rotating drum (not shown) of the inclined rotary kiln 14 and passed therefrom as exhaust gas, as shown. A plurality of tire chips 16 are fed into the rotating drum of the inclined rotary kiln 14 for pyrolytic heating. As the tire chips 16 travel through the inclined rotary kiln 14, the tire chips 16 are immersed in a flow of recycled oil 18 while the tire chips 16 begin to break down as the tire chips 16 are exposed to a continuous variance of temperature, increasing from about 237° F. to 1000° F., preferably from 400° F. to 500° F., with a maximum oil yield occurring at 450° F. The coolest temperature is at an input end of the inclined rotary kiln 14 while the hottest temperature is at an output end of the inclined rotary kiln 14. The low temperatures expended during the pyrolysis expends a lower amount of energy and thereby provides a more efficient process. The high temperatures in the inclined rotary kiln 14 cause volatile hydrocarbons to vaporize and to pass out of a kiln discharge hood 26. The pressure within the kiln 14 ranges from approximately 3 in. of $H_2O$ to about 5 in. of $H_2O$.

At the completion of the pyrolysis process, the tire chips 16 have been effectively decomposed to their solid, elementary components 20. The solid product, 20, because of the absence of combustion, comprises mostly char, metal, and fabric material. This solid product 20 passes from the kiln 14 to an ash conveyor 22. The ash conveyor 22 carries the solid product 20 to a magnetic separator 24, wherein steel is separated from the char ash. The char is subsequently stored for later conversion to carbon black.

Turning now to FIG. 1B, shown therein is a continuation of the tire pyrolysis process wherein the flow diagrams for vapor condensation and oil and solid recoveries are shown. As shown, the incline of the inclined rotary kiln 14 facilitates gravitational separation of the solid product 20 and the vapor product 28 so that the less dense vapor product 28 drifts to the top of the inclined rotary kiln 14 while the more dense solid product stays at the bottom of the inclined rotary kiln 14. Gravitational separation facilitates efficient separation of the vapor product 28 from the solid product 20 without introducing foreign purging agents. The vapor product 28 is sent to a first condenser/scrubber 30 to extract any remaining oil. The vapor product 28 is subsequently sprayed with cooled, recycled oil 32, causing the larger molecules (generally eight or more carbon atom's) to condense. The oil condensate 34 exits from the bottom of the first condenser/scrubber 30.

Returning to FIG. 1A, the oil condensate 34 follows three paths. The first oil stream 18 is recycled back into the kiln 14 to wet the tire chips 16. A second stream 36 of condensate 34 passes through a first air cooled heat exchanger 38. A third stream 40 of condensate 34 mixes with the air cooled second stream 36 before flowing into an oil/solids separator 42. The oil/solids separator 42 precipitates the solid char from the oil. The solid char is collected for later conversion to carbon black. The separated heavy oil from the oil/solids separator 42 follows two distinct streams. A first stream 44 of heavy oil is collected in a storage unit while a second stream 46 is recycled back into various points of the first condenser/scrubber 30 to facilitate condensation.

Continuing now with FIG. 1B, uncondensed vapor product 28A in the first condenser/scrubber 30, such as the light oils, passes through a mist eliminator 48 and is passed to a second condenser/scrubber 50. The second condenser/scrubber 50 is contacted with recycled oil 32 from the storage unit, causing the light oils to condense. The oil condensate 52 is separated into two different streams: a first stream 54 of the oil condensate 52 passes through a second air cooled heat exchanger 56; and a second stream 58 of oil condensate 52 mixes with an air cooled stream 60 of condensate before entering into an oil/water/solid separator 62. The oil/water/solid separator 62 separates oil from the solid char, with some oil collected within the storage unit and another portion of the oil introduced back into the second condenser/scrubber 50 to facilitate condensation. The collected char is conveyed to a separate site for such use as the production of carbon black.

The gas remaining after the oil recovery, pyro-gas 64, is fed from the second condenser/scrubber 50 to the engine 12, which is operated in a useful manner, such as to power a generator for producing electrical power. The exhaust of the engine 12 is directed to the annular space between the outer shell and the inner drum of the inclined rotary kiln 14. Of course, it will be understood that the object is to use the heating valve (enthalpy) of the pyro-gas 64 to usefully heat the inner drum of the inclined rotary kiln 14, and it is within the scope of the present invention to use the pyro-gas 64 in any manner to achieve such object. For example, the pyro-gas 64 can be combusted and the products of combustion passed through the annular space between the outer shell and the inner drum of the kiln 14.

Figure 2:
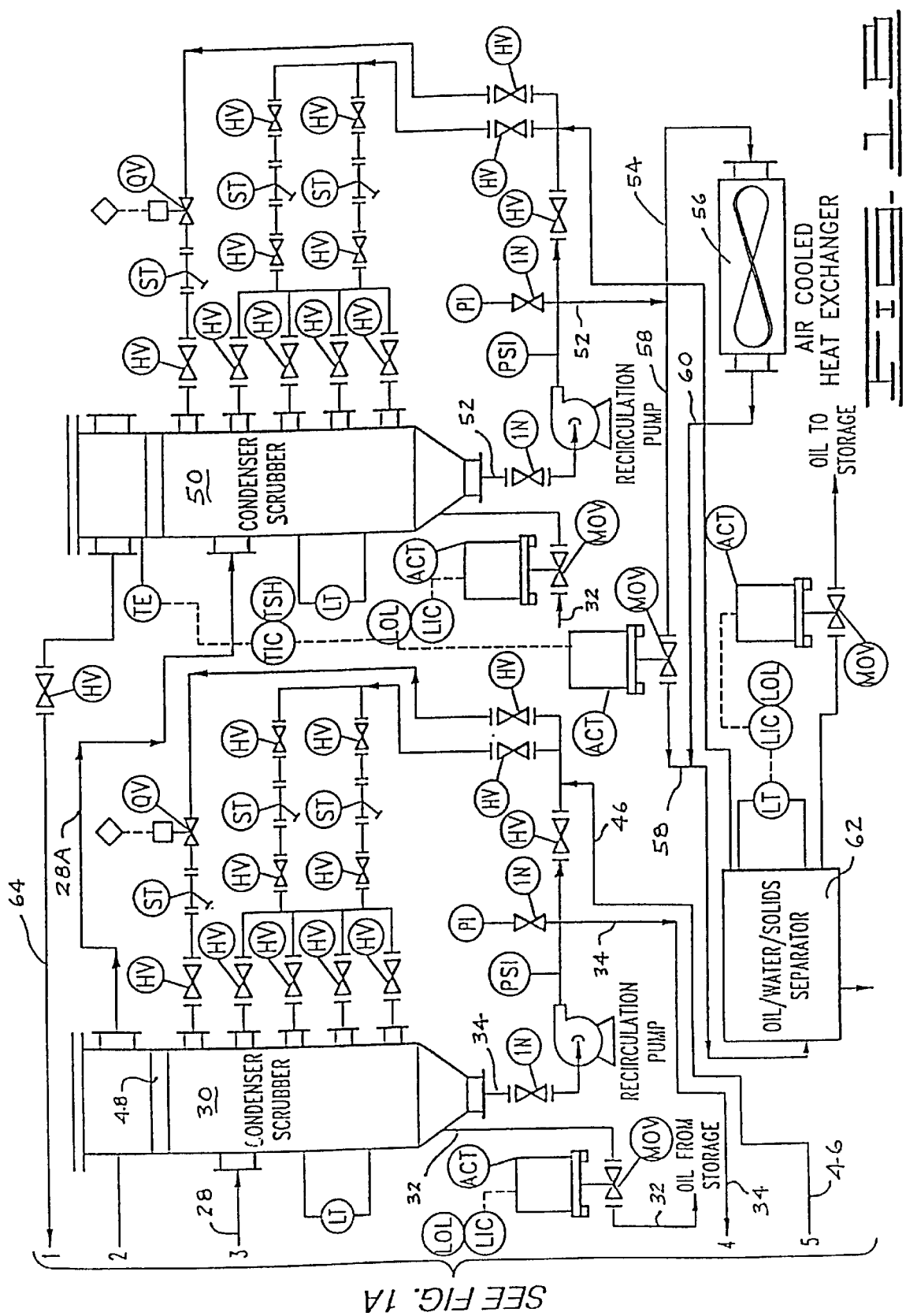
FIG. 2 provides mass and energy balances for the tire pyrolysis process depicted in FIGS. 1A and 1B.

A detailed analysis of the mass and energy balances for the apparatus and process of the present invention are presented in FIGS. 2–7. Provided in FIG. 2 is a table of the overall mass and energy balances for the product and process as depicted in FIGS. 1A–1B. It should be noted that for the kiln 14 to effectively tumble and rotate, the kiln 14 should not be filled to more than about twenty percent of its capacity. Therefore, the twenty percent capacity of the kiln 14 along with the 60 foot length of the kiln 14, as depicted in the table in FIG. 2, determines the design parameters of the process, and allows a total feed rate of 10,000 lbs/hr. Both tire chips-(solids) and the oil are fed into the kiln 14.

Turning to FIG. 3, shown therein is a table containing mass and energy balances for the kiln discharge hood 26. The kiln discharge hood 26 provides an outlet for the vapor product 28 which enters the first condenser scrubber 30. Note that the shell heat loss of 7740 BTU/hr indicates the amount of heat given off by the kiln discharge hood 26.

Turning to FIG. 4, shown therein is a table containing mass and energy balances for the condenser scrubber 30 wherein the vapor is separated from the oil to yield a gaseous phase and an oil phase. The inlet flue flow of 7576 lbs/hr equals the amount of gas flow out of 7576 lbs/hr from the kiln discharge hood as depicted in the table in FIG. 3.

Turning now to FIG. 5, shown therein is a table containing mass and energy balances for the engine 12 that drives the process and apparatus as depicted in FIGS. 1A–1B. The total gas flow or electric power of 14,047 lbs/hr is a measurement provided by a manufacturer of the engine 12 as used in driving a process as depicted in the present invention. It should be understood that the details of construction of the engine 12 are not believed to be necessary for the present disclosure and will be readily understood by those skilled in the art.

Turning to FIG. 6, shown therein is a table containing mass and energy balances for a plenum (not shown) of the kiln 14. The plenum is an area around the kiln 14 wherein exhaust from the engine 12 circulates to heat the kiln 14. The exhaust exit temperature of 1350° F. heats the kiln 14. Heat is released through flue gas exiting the plenum at a flue gas exit temperature of 690° F., thereby heating the kiln 14 at a lower temperature.

Turning now to FIG. 7, shown therein is a table containing mass and energy balances for stack gas used to vent the process and apparatus of the present invention as shown in FIGS. 1A–1B. A stack (not shown) allows excess heat from the process of the present invention to be vented to the atmosphere. The gas to atmosphere of 2,458,330 BTU/hr allows a determination of the 3.14 ft$^2$ stack area required. It should be understood that the details of construction of the stack are not believed to be necessary for the present disclosure and will be readily understood by those skilled in the art.

It is clear from the above description and the example provided that the present invention is well adapted to carry out the objects and to attain the ends and advantages mentioned as well as those inherent therein. While presently preferred embodiments have been described for the purposes of this disclosure, it will be appreciated that numerous changes in the arrangement of steps and apparatus components can be made by those skilled in the art. Such changes are encompassed within the spirit of this invention as defined by the appended claims.

What is claimed is:

1. A process for pyrolyzing tire chips comprising:
    passing the tire chips into an input end of an inclined rotary kiln, the inclined rotary kiln having an output end;
    saturating the tire chips with a first oil stream in the inclined rotary kiln;
    pyrolyzing the tire chips continuously in the inclined rotary kiln by indirectly heating the tire chips and the first oil stream by a heated gas at a given temperature at below atmospheric pressure, whereby the inclined rotary kiln rotates the tire chips within the first oil stream to allow for increased chemical interaction between the tire chips and the first oil stream to allow effective dissociation of the tire chips into a first vapor product and a solid product, the solid product and the first vapor product separated within the kiln through gravitational separation;
    processing the first vapor product to condense oil, wherein processing the first vapor product comprises the steps of:
        passing the first vapor product through a discharge hood of the inclined rotary kiln to a first condenser scrubber;
        spraying the first vapor product with cooled oil to condense a first oil product from the first vapor product, thereby leaving a second vapor product;
        passing the second vapor product through a second condenser scrubber;
        spraying the second vapor product with cooled oil to condense a second oil product from the second vapor product, thereby leaving a third vapor product; and
        producing a heated gas from the third vapor product to heat the tire chips in the inclined rotary kiln;
    recovering oil from the solid product and vapor product and recycling a portion of the oil to the inclined rotary kiln for saturating the tire chips; and
    separating the solid product to recover char there from.

2. The process of claim 1, wherein the step of producing a heated gas from the third vapor product comprises:
    compressing the third vapor product; and
    using the compressed third vapor product to power an engine to produce the heated gas.

3. The process of claim 1, wherein recovering oil from the solid product and the vapor product comprises the steps of:
    cooling a part of the first oil product in an air cooled heat exchanger to create a first air cooled oil stream, the first air cooled oil stream passing through an oil solids separator to precipitate char from the first air cooled oil stream, the oil remaining being recycled back to the inclined rotary kiln; and
    cooling a part of the second oil product in a second air cooled heat exchanger to create a second air cooled oil stream, the second air cooled oil stream passing through an oil water solids separator to precipitate char from the second air cooled oil stream, the oil remaining being stored in a storage unit.

4. An apparatus for pyrolyzing a plurality of tire chips, the apparatus comprising:
    an inclined rotary kiln for receiving the tire chips, the tire chips being immersed in a first stream of oil while the inclined rotary kiln continuously and indirectly heats the first stream of oil and the tire chips, the inclined rotary kiln rotating to provide a maximum contact between the oil and the tire chips, thereby allowing efficient chemical interaction to separate the tire chips into a first vapor product and a solid product having a char constituent;
    a magnetic separator for receiving the solid product from the rotary kiln and for separating char from the solid product;
    first condenser scrubber means for receiving the first vapor product from the rotary kiln and for condensing oil from the first vapor product to produce therefrom condensed oil and a pyro-gas stream, a portion of the condensed oil recycled to the rotary kiln;
    means for cooling another portion of the condensed oil and for extracting char from the cooled portion of the condensed oil; and
    engine means receiving a portion of the pyro-gas stream, the engine means being at least partially powered by the pyro-gas stream and heating the first stream of oil and tire chips in the rotary kiln.

5. The apparatus of claim 4, wherein the inclined rotary kiln has the capacity to heat the oil and tire chips continuously from between about 237° F. to 1000° F.

6. The apparatus of claim 5, wherein the inclined rotary kiln has the capability of maintaining pressure inside the inclined rotary kiln below atmospheric pressure in a range of from about 3 in. of $H_2O$ to about 5 in. of $H_2O$.

7. The apparatus of claim 4, wherein the engine means produces exhaust gas, and wherein the inclined rotary kiln has an external jacket, the exhaust gas is passable through the external jacket of the inclined rotary kiln to heat an inner wall of the inclined rotary kiln so that the tire chips and oil can be heated therein.

8. The apparatus of claim 4, further comprising:

second condenser scrubber means for receiving the pyro-gas stream from the first condenser scrubber means and for condensing oil from the pyro-gas stream, a portion of the condensed oil recycled to the rotary kiln; and means for producing electrical power from the pyro-gas stream from the second condenser scrubber.

9. The apparatus of claim 8, further comprising:

an oil solids separator through which at least a portion of the condensed oil is passed, whereat a char product is precipitated from the condensed oil, the condensed oil from the oil solids separator passing to the first and second condenser scrubber means.

10. A process for pyrolyzing a plurality of tire chips comprising:

passing the tire chips into an input end of an inclined rotary kiln, the inclined rotary kiln having an output end;

saturating the tire chips with a first oil stream in the inclined rotary kiln;

pyrolyzing the tire chips continuously in the inclined rotary kiln by indirectly heating the tire chips at a given temperature at below atmospheric pressure, whereby the inclined rotary kiln rotates the tire chips within the first oil stream to allow for increased chemical interaction between the tire chips and the first oil stream to allow effective dissociation of the tire chips into a first vapor product and a solid product, the solid product and the first vapor product separated within the kiln through gravitational separation;

processing the first vapor product to condense oil;

recovering oil from the solid product and vapor product and recycling the oil into the inclined rotary kiln for saturation of the tire chips and for recovering condensed oil from the first vapor product;

operating an engine to produce an exhaust gas stream; and using the exhaust gas stream to indirectly heat the tire chips in the rotary kiln.

11. An apparatus for pyrolyzing a plurality of tire chips, the apparatus comprising:

an inclined rotary kiln for receiving the tire chips, the tire chips being immersed in a first stream of oil while the inclined rotary kiln continuously and indirectly heats the first stream of oil and the tire chips, the inclined rotary kiln rotating to provide a maximum contact between the oil and the tire chips, thereby allowing efficient chemical interaction to separate the tire chips into a first vapor product and a solid product comprising char, steel and fabric material;

a magnetic separator for receiving the solid product from the rotary kiln and for separating char from the solid product;

first condenser scrubber means for receiving the first vapor product from the rotary kiln and for condensing oil from the first vapor product to produce there from condensed oil and a pyro-gas stream, a portion of the condensed oil recycled to the rotary kiln;

means for cooling another portion of the condensed oil and for extracting char from the cooled portion of the condensed oil; and engine means receiving a portion of the pyro-gas stream, the engine means being at least partially powered by the pyro-gas stream and heating the first stream of oil and tire chips in the rotary kiln.

\* \* \* \* \*